United States Patent [19]

Scholz

[11] 4,426,907

[45] * Jan. 24, 1984

[54] AUTOMATIC TUNING DEVICE

[76] Inventor: Donald T. Scholz, 13 Rich Valley Rd., Wayland, Mass. 01887

[ * ] Notice: The portion of the term of this patent subsequent to Mar. 1, 2000 has been disclaimed.

[21] Appl. No.: 430,774

[22] Filed: Sep. 30, 1982

Related U.S. Application Data

[63] Continuation of Ser. No. 300,759, Sep. 10, 1981, Pat. No. 4,375,180, which is a continuation-in-part of Ser. No. 190,753, Sep. 25, 1980, abandoned, which is a continuation of Ser. No. 74,166, Sep. 10, 1979, abandoned, which is a continuation of Ser. No. 931,841, Aug. 7, 1978, abandoned.

[51] Int. Cl.³ .............................................. G01G 7/02

[52] U.S. Cl. .................................. 84/454; 73/862.42; 318/6

[58] Field of Search ................. 84/454, 455, 458, 459, 84/200, DIG. 18, 24; 73/862.42, 862.43; 318/6, 488; 324/78 N, 79 R, 80

[56] References Cited

U.S. PATENT DOCUMENTS

| | | | |
|---|---|---|---|
| 2,624,027 | 12/1949 | Clark | 73/862.42 |
| 3,144,802 | 6/1961 | Faber, Jr. et al. | 84/454 |
| 3,396,284 | 8/1968 | Scherer | 84/DIG. 4 X |
| 4,041,832 | 8/1977 | Risch | 84/454 |
| 4,044,239 | 8/1977 | Shimauchi et al. | 84/455 |

FOREIGN PATENT DOCUMENTS

| | | | |
|---|---|---|---|
| 122532 | 9/1927 | Switzerland | 84/454 |

*Primary Examiner*—E. A. Goldberg
*Assistant Examiner*—Todd E. DeBoer
*Attorney, Agent, or Firm*—Wolf, Greenfield & Sacks

[57] ABSTRACT

A stringed musical instrument is provided with an automatic self-tuning device which tightens or loosens those of the instrument's strings which may be out of tune. Each string is provided with an independent automatic tuning device and all of the devices are operated simultaneously on demand to instantly and automatically reset the tension of the strings as required. Each of the devices includes means for sensing the tension of its associated string and means for comparing the sensed tension with a reference tension corresponding to the desired tuning for the string. Means are provided for increasing or decreasing the string tension in response to the nature and magnitude of the compared tensions.

In an alternate version, string tension is sensed and a visual indication is given of an out-of-tune condition. The instrument is tuned in this embodiment manually.

1 Claim, 16 Drawing Figures

AUTOMATIC TUNING DEVICE

RELATED APPLICATIONS

This is a continuation of application Ser. No. 300,759, filed Sept. 10, 1981, now U.S. Pat. No. 4,375,180 which is a continuation-in-part of Ser. No. 190,753 filed Sept. 25, 1980 now abandoned which is a continuation of Ser. No. 74,166 filed Sept. 10, 1979 now abandoned which is a continuation of Ser. No. 931,841 filed Aug. 7, 1978 now abandoned.

BACKGROUND OF THE INVENTION

The present invention relates to an automatic tuning device preferably for use with a stringed musical instrument such as an electronic guitar. The tuning device is operable periodically to provide immediate, simultaneous and automatic retuning of the strings of the instrument. While the device of this invention may be used in association with any string musical instrument, it is particularly suited for use with instruments which are apt to go out of tune quite easily, such an an electric guitar.

The invention is useful particularly by professional musicians in concert, where it is not uncommon for some or all of the strings to go out of tune a number of times during a performance. This condition may result from a number of causes, for example, from excessive heat from stage lights or simply from the stresses that are imparted to the strings during the concert. Usually, the player must take a few awkward minutes, possibly interrupting the uniform flow of the performance, in order to retune.

Accordingly, it is one object of the present invention to provide an automatic tuning device for a stringed instrument such as an electric guitar.

Another object of the present invention is to provide an automatic tuning device that permits easy and immediate retuning of the instrument upon demand.

Still another object of the invention is to provide an automatic, instantaneous retuning device which may be operated during a performance, even during the performance of a piece, without significant interruption.

A further object of the present invention is to provide an automatic tuning device for a stringed instrument which operates on the principle of sensing the tension associated with each string, comparing the sensed tension with a predetermined, preselected tension, and comparing the sensed and predetermined tensions to make any necessary correction to the actual string tension.

To accomplish the foregoing and other objects of this invention, there is provided a tuning device preferably supported at the body of the instrument adjacent the bridge and including individual means for anchoring an end of each string of the instrument. The anchoring means is movable in a manner to vary the tension on its associated string. Means also are provided for sensing the tension associated with the string. Each anchor means is associated with a drive means adapted to move the anchor means in a selected direction, either to increase or decrease the tension on the string. The tuning device also includes control means, preferably in the form of an electrical bridge circuit, for providing a comparison between the sensed tension of the string and a predetermined tension that may be set to correspond with the tension that is desired in the string. The control means is operatively associated with the drive means to cause the drive means to move the anchor means in a direction and to an extent which will tension the string to a value corresponding to the predetermined desired tension.

In the disclosed embodiment, the control means is operated periodically so that the comparison and returning operation only occurs by way of manual command from the player. The returning of all strings preferably occurs with a single command when the player has determined that one or more of the strings is out of tune.

In accordance with the preferred embodiment described herein, the anchor means may be in a form of a pivotable lever having the string attached to one end, the other end of the lever being movable by a drive means to increase or decrease the tension in the string. The string tension is sensed by a strain gage preferably attached to the lever member. In this connection, the lever member preferably is at least partially flexible so that the tension on the string is imparted to the lever member and thereby sensed by the strain gage means. The control means comprises a bridge circuit means which includes the strain gage windings as a part of the bridge circuit.

In accordance with another embodiment of the present invention a bi-directional sensing switch is provided instead of a strain gage arrangement. This alternate embodiment includes a tuning adjust screw associated with each string and common control means for the gage adjustment of all tuning adjust screws. Still other version of the present invention sense tensions by means of a pizzoelectric transducer or capacitive transducer.

DESCRIPTION OF THE DRAWINGS

The foregoing and other objects and advantages of the invention will be appreciated more fully from the following further description thereof, with reference to the accompanying drawings wherein.

DETAILED DESCRIPTION OF THE PREFERRED EMBODIMENT

Figure 1:
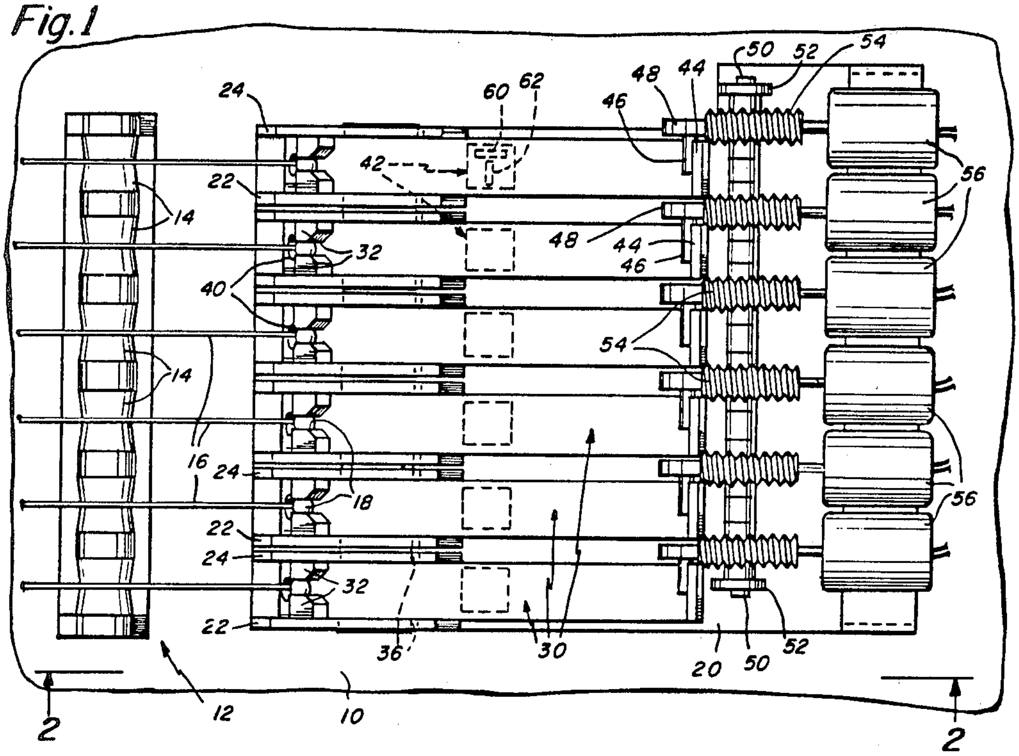
FIG. 1 is a fragmentary top view of a portion of the body of a stringed musical instrument depicting the device of this invention.
Figure 2:
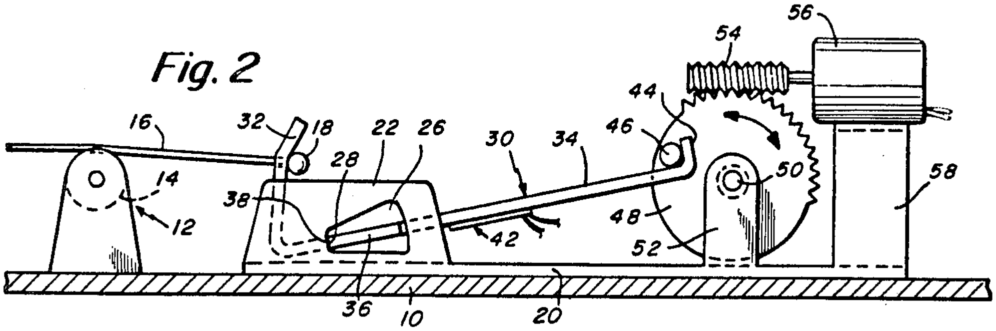
FIG. 2 is a cross-sectional view taken along line 2—2 of FIG. 1 showing the device in further detail.

FIGS. 1 and 2 show the device as it might be mounted to the body 10 of an electric guitar. In the drawings, only a portion of the body 10 of the guitar is shown, it being understood that the instrument also has a neck extending from the body and means on the neck for securing one end of each of the strings. The device is secured to the guitar body 10 at a location behind the bridge which is indicated generally by the reference character 12. The bridge preferably includes a plurality of low-friction rollers 14 which are grooved and which receive and support the strings 16. Each string 16 is provided with an enlarged member, such as the ball 18, to facilitate its attachment to the device, as will be described.

The device includes a base member 20 which is secured to the body 10 of the guitar and which provides support for the other elements and components of the device. The base member may be formed from a plate of sheet metal and is formed to include a number of pairs of transversely spaced pivot lugs 22, 24 which extend upwardly from the base 20, at the forward end of the base. The device is provided with one pair of such pivot lugs for each of the strings of the instrument. Each of the lugs 22, 24 is formed to include an opening 26. The openings 26 preferably are of a configuration which tapers in a forward direction, defining a narrowed forward end 28 which serves as a bearing fulcrum surface, as described below.

Each pair of pivot lugs 22, 24 supports an anchor bar or lever, indicated generally at 30, there being an anchor lever 30 associated with each of the strings. In the illustrated embodiment, each of the levers 30 is generally L-shaped, having a pair of upwardly extending fingers 32 at its forward portion and a rearwardly extending main portion indicated at 34. The strings 16 are attached to the upwardly extending forward portions of the anchor bars 30 by inserting them between the fingers 32 so that the restraining member such as the ball 18 is engaged as shown. Each of the anchor bars 30 is pivotally mounted to a pair of pivot lugs 22, 24 by means of a pair of transversely extending fingers 36, formed integrally with each anchor bar 30. The fingers are dimensioned so that they will be received in the openings 26 of the lugs 22, 24. The fingers 36 are formed to include forward edges 38 which bear against the narrowed forward end 28 of the openings 26, thereby defining a transversely extending pivot axis or fulcrum about which each of the anchor bars 30 may have independent limited pivotal movement.

From the foregoing, it will be appreciated that the tension in each of the strings 16, applied to its associated anchor bar 30, will tend to pivot the anchor bar about the fulcrum 28, 38, tending to raise the rearwardly extending main portion 34 of the anchor bar 30 (counterclockwise as seen in FIG. 2). Means, described further below, are provided for engaging the rearwardly extending portion 34 of the anchor bars 30 to balance and resist the moment applied to the bars 30 by the tension of the strings 16. Each of the anchor bars 30 is formed so that its main portion 34 is comparatively long and will display a measurable amount of flexibility, depending on the moment applied by the tension of the strings 16. The degree of flexure of the anchor bar is proportional to the moment applied by its associated string 16. Thus, the extent of flexure of the rearwardly extending main portion 34 of the anchor bar 30 may be considered as being a measure of the tension and, therefore, the pitch of the string 16. Means are provided to sense the flexure of the main portion 34, including a strain gage package 42 which is attached to each of the main portions 34, preferably to their undersides as indicated in FIG. 2. The strain gage package 42 will detect and provide an output signal corresponding to the magnitude of the flexure of the anchor bar portion 34. The output from the strain gage package 42 is used to control operation of a motor and gear arrangement which is employed to pivot the anchor bar so that the string 16 will be tensioned properly as described herein.

Each of the anchor bars 30 is maintained in its position by an arrangement which includes the rearwardly extending portion 34 of the anchor bar 30 which is maintained in engagement with a pin 46 which, in turn, extends transversely from a segmented gear 48. The gear 48, in turn, is supported by means of a shaft 50 and bearing members from the base member 20. The gear 48 is driven by a worm gear 54 which, in turn, is driven by a motor 56, supported from a motor support 58. The arrangement of the bar 30, pin 46, gear 48, worm gear 54 and motor 56 insures that when the motor is not operating (which is usually the case), the anchor lever 30 will be maintained in a fixed position, resisting the moment applied by the strings, and will maintain the strings 16 in tune. It will be appreciated that the tension of the strings 16 continually biases the rearwardly extending portion 34 of the anchor bar 30 into continuous engagement with the pin 46.

The motors 56 may be operated upon demand by the user, in a direction which will drive the segmented gears 48 in either direction as indicated by the arrows in FIG. 2. Thus, motors 56 may be employed either to increase the tension or decrease the tension on their strings 16, thereby varying their pitch. To this end, the motors 56 preferably are of the conventional high speed DC reversible variety, which are commercially available from a number of sources.

Thus, the angular pivot attitude of the anchor bar 30 about the fulcrum 28, 38 is controlled by operating the motor 56 to rotate the gear 48 and the pin 46 between its range of positions. It is noted that the gears 48 are segmented and do not rotate through 360°. Rather, they rotate through an angle of approximately 120°, to limit the extent to which the anchor lever 30 may be pivoted. As shown in FIG. 2, rotation of the gear in a counterclockwise direction causes the bar 30 to pivot clockwise, thus increasing the tension and pitch of the string. Conversely, rotation of the gear 48 in a clockwise direction causes the bar 30 to pivot counterclockwise, decreasing the tension and pitch of the string 16.

Figure 3:
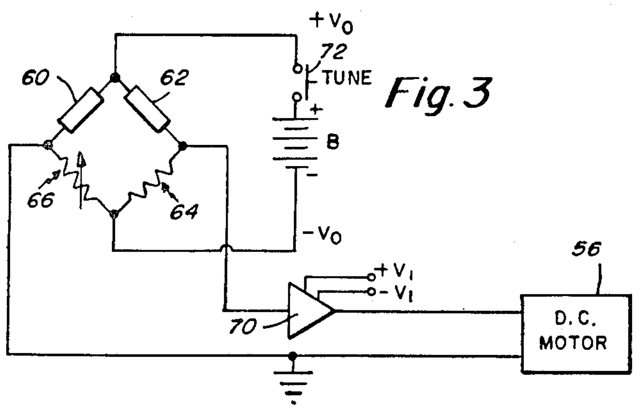
FIG. 3 is a circuit schematic diagram showing the control circuitry in accordance with the invention.

As shown in FIG. 1, each strain gage package 42 includes strain gage resistance elements 60, 62, which are also shown, schematically in FIG. 3. It will be appreciated that when the motor 56 is operated to increase the pitch of the string 16, there will be an increase in the flexure of the anchor lever 30 with a correspondingly modified output signal from its associated strain gage package 42. Conversely, if the motor 56 is operated to decrease the string pitch, there is a corresponding decrease in the flexure of the portion 34 of the lever 30 which results in a correspondingly opposite output signal from the strain gage package 42.

The strain gage package 42 may be selected from any one of a variety of commercially available packages which typically include strain gage resistance elements 60, 62. These elements are provided in a package and are usually adhered to the member to be measured in a perpendicular configuration as suggested in FIG. 1. The strain gage elements are shown in their physical position in FIGS. 1 and 2 but are shown in FIG. 3 as being connected in a bridge circuit which is of a common Wheatstone bridge configuration. As shown in FIG. 3, the other legs of the bridge include a fixed value resistor 64 and a variable resistor 66 which is adjustable to correspond to the proper intended pitch for the particular string. The variable resistor may be in the form or a simple potentiometer having a control knob which may be mounted at any suitable location on the body of the instrument. There are, of course, a plurality of such potentiometers and control knobs as well as a corresponding plurality of motors 56 and associated gear mechanisms associated with each string of the instrument.

FIG. 3 is a schematic circuit diagram of a preferred form of control circuit for each string. As previously indicated, this control circuit includes a bridge circuit comprised of the strain gage resistive elements 60, 62 and the fixed resistor 64 and variable resistor 66. The two resistors 64, 66 are selected to be compatible with the resistive elements 60 and 62. The bridge circuit, as well as the operational amplifier 70 are powered by a battery B which couples by way of the "tune" switch 72 to the input of the bridge circuit. The output from the bridge circuit couples to the input of the operation amplifier which also receives operating voltage from the battery B, either directly or by way of the tune switch 72. The output from the operational amplifier couples to the DC motor 56. The switch 72 is a momentary switch which preferably operates all bridge circuits in a ganged fashion and may be mounted to the instrument at any convenient location.

In operation, the instrument is tuned initially in its usual manner, by tuning pegs or the like. It is not necessary that the tuning be precise. Final tuning is effected by operating switch 72 to close the bridge circuit and by adjusting each of the variable resistances 66. Thus, for each string, its associated control knob 66 is rotated therey providing either a positive or negative control signal to the operational amplifier depending upon the value of the variable resistor. The DC motor 56 thus is operated to either increase or decrease the tension on the string 16 until a null condition is reached corresponding to the intended pitch of that string. At that point, the variable resistor is maintained in a fixed position corresponding to the proper tension of the string 16. The same procedure is used with the other strings until all of the strings have been tuned.

If, after a period of time, the tension in the string 16 either increases or decreases, then the switch 72 can later be momentarily closed to retune the strings. Switch 72 is a momentary switch that is normally open thus providing no signals to the operational amplifier and DC motor 56. When the player decides that retuning is necessary, the momentary switch 72 is closed, thereby powering all bridge circuits and, in turn, operating the associated DC motors where necessary. The DC motor 56 is preferably of the type that operates quite rapidly which results in substantially immediate retuning. Depending on whether there has been a relaxation or an increase in tension of the string 16 there will be either a positive or negative voltage coupled to the operational amplifier and the output from this amplifier will be of a polarity to rapidly drive the DC motor 56 in the proper direction to change the tension in string 16 to again cause a balanced condition in the bridge circuit. It should be noted that some, but not necessarily all, of the strings may be out of tune. As to those strings which are not out of tune, there is essentially no signal coupled to the operational amplifier and the DC motor 56 operates in neither direction, instead simply maintaining the tension in the string 16 imparted by the anchor bar 30. Although FIG. 3 shows control associated with only one string, it is understood that the correct tension for each string is set by setting the variable reference resistor in each bridge circuit associated with individual strings.

FIGS. 4–14 depict other versions of the present invention all embodying the basic principles described herein for providing immediate and automatic retuning of the strings of a stringed musical instrument. In these further versions of the invention, like reference characters will be used as previously assigned in the preferred embodiment of FIGS. 1–3.

Figure 4:
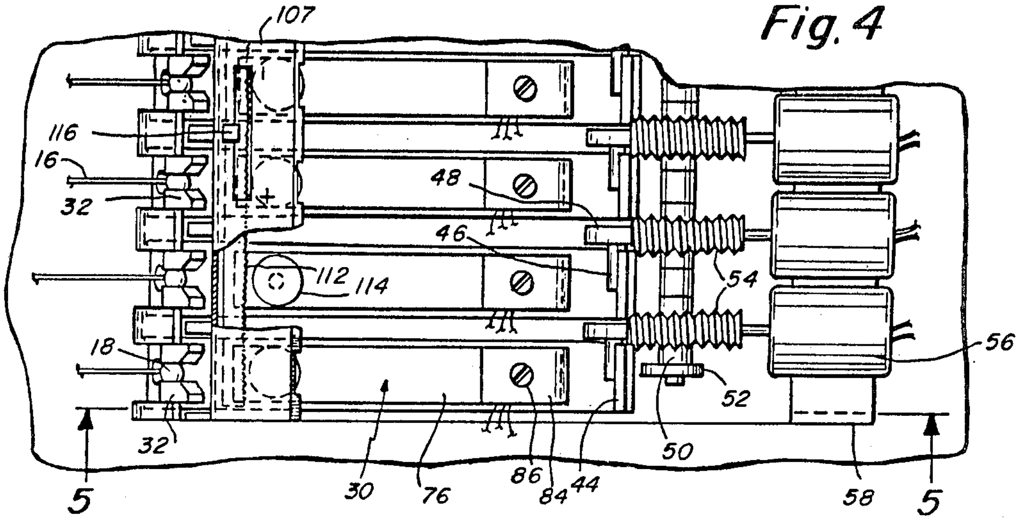
FIG. 4 is a fragmentary top view of a portion of a body of a stringed musical instrument depicting another embodiment of the present invention.
Figure 5:
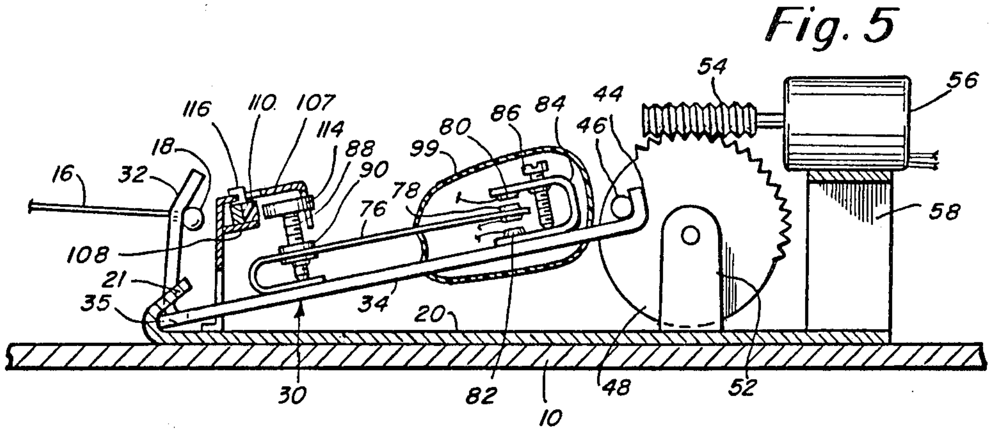
FIG. 5 is a cross-sectional view taken along line 5—5 of a stringed musical instrument depicting another embodiment of the present invention.
Figure 6:
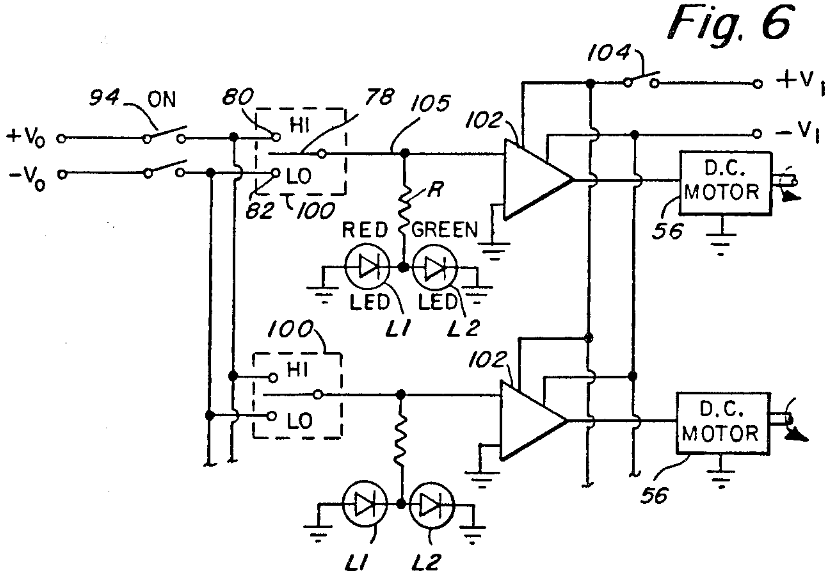
FIG. 6 is a circuit schematic diagram showing the control circuitry for the embodiment of FIGS. 4 and 5.

FIGS. 4–6 show one alternate version of the present invention employing a bi-directional switching element for controlling an associated drive motor. The device of this invention is secured to the guitar body 10 in a manner and at a position as previously described in FIGS. 1 and 2. The strings 16 extend over the bridge and each string is provided with an enlarged member, such as the ball 18, which facilitates the strings' attachment to the device. The device includes a base member 20 which is secured to the body 10 of the guitar in some suitable manner. The member 20 provides support for the other elements and components of the device. The base member 20 may be formed from a plate of sheet metal and has a turned end 21 as clearly depicted in FIG. 5. The end 21 effectively forms a fulcrum point and may accommodate wings or lugs 35 on the lever 30 in an manner similar to the arrangement previously described in connection with FIGS. 1 and 2.

Each of the levers 30 is generally L-shaped having a pair of upwardly extending fingers 32 at its forward end for receiving the string 16 and a rearwardly extending main portion 34.

Each of the anchor bars or levers 30 is controlled by virtue of the portion 34 which is maintained in engagement with a pin 46 which, in turn, extends transversely from a segmented gear 48. The gear 48 is supported by means of a shaft 50 and bearing members from a base member 20. The gear 48 is driven by a worm gear 54 which is driven by a motor 56 supported from a motor support 58.

A contact lead 76 has one end fixed to the top surface of lever 34 and has another end that is free supporting contact 78. The contact 78 along with contacts 80 and 82 are preferably gold plated contacts. The contacts 80 and 82 are supported on facing ends of the U-shaped contact support 84. The screw 86 is an adjustment screw for the separation of the contacts 80 and 82. FIG. 5 shows leads extending from each of the contacts 78, 80 and 82. Reference is also made hereinafter to FIG. 6 which depicts the contact arrangement.

The device also includes a tuning adjustment screw 88 which is received by an internally threaded insert 90 supported in the contact lead 76. The member 84 and the lever 34 are preferably of a heavy gage steel whereas the contact lead 76 is of a relatively thin gage steel. In FIG. 5 the contact lead 76 is shown in its intermediate position with its associated contact 78 disposed intermediate the contacts 80 and 82 but contacting neither of these contacts. This is the proper position of the contact lead when the associated string is properly tuned. In this regard, the guitar or other instrument may be initially tuned in a conventional manner, then the on-off switch 94 is turned on followed by an initial adjustment by means of the adjusting screw 80 until the center contact 78 is not touching either of the other contacts 80 or 82. This tuning operation is performed for each and all of the strings. Preferably, a flexible seal 99 is provided around the contacts as depicted in FIG. 5.

FIG. 6 shows a schematic diagram depicting the circuitry for controlling the motor 56. In FIG. 6 only two stages are shown including two bi-directional switches 100. Each of these bi-directional switches is shown schematically as including the contacts 78, 80, 82. The contacts 80 and 82 receive respective positive and negtive voltage levels by way of the on-off switch 94. The movable contact 78 may be in an intermediate position between the contacts 80 and 82 or may couple signals from either one of these contacts but of course not from both contacts at the same time. The movable contact 78 fixed to the contact lead 76 couples to an input of the DC amplifier 102. Power to each of the amplifiers 102 is coupled from the positive and negative voltage terminals by way of the tune switch 104. In the open position of the tune switch 104, power is not coupled to any one of the amplifiers 102 and thus in that position there is no possibility of a control signal from the output of the amplifier to the DC motor 56. The signal line 105 that couples to the input of the amplifier 102 also has a connection by way of resistor R to the payer of light emitting diodes L1 and L2. The diode L1 may illuminate a red condition while the diode L2 illuminates a green condition. These diodes will be illuminated under proper conditions even when the switch 104 is open. The red or green indication at the light emitting diodes indicates that the string is sharp or flat respectively. When either of these conditions is indicated, then the tune switch 104 may be closed with either a positive or negative signal being coupled to the DC amplifier with the output of the amplifier then driving the DC motor 56 in the appropriate direction. Thus, for example, if the contacts 78 and 80 are closed, then the LED L2 is illuminated and there is a positive output voltage level from the amplifier 102 causing the motor 56 to operate in the opposite direction causing a tightening of the string. If the movable contact 78 is in the position shown in FIG. 6 then upon closure of the tune switch 104 there is no output signal from the amplifier 102 to drive the DC motor in either direction.

To initially set up the device of this invention the guitar is tuned in a conventional manner. Once this has been accomplished, then the individual tuning screws 88 are operated so as to center the contact lead 76 thus extinguishing any of the indicators that may be illuminated. Then, at a later time, if any one of the indicators becomes illuminated to indicate either a loosening or tightening of a string the tune button 104 may be closed to provide automatic retuning of that string by operation of the DC motor 56 in the appropriate direction.

The embodiment shown in FIGS. 4 and 5 is also provided with another feature which provides for the ganged tuning of all tuning screws 88 so as to tune all strings to either a slightly higher or slightly lower than normally tuned pitch. This feature is embodied in the form of a shroud 107 having a lower leg supported from the base member 20. This shroud extends over all of the tuning screws but leaving an edge of each tuning screw accessible through an opening in the shroud 107. The shroud 107 includes a plate 108 which may be integral with the shroud and which supports a slide member 110. The slide member 110 is of elongated shape as depicted in FIG. 4 having a toothed surface 112 adapted to engage with an outer toothed periphery of the head 114 of the tuning screw 88. In the position shown in FIG. 4 the tab 116 of the slide member 108 is at its intermediate position with the slide member 110 essentially out of contact with the tuning screws. The tab 116 may then be moved into the slide channel in the shroud into engagement with all of the tuning screws whereby the slide member 110 may be moved in either direction for rotating all of the tuning screws in unison either clockwise or counterclockwise depending upon whether the operator wishes to increase or decrease the pitch of all strings in unison.

Figure 7:
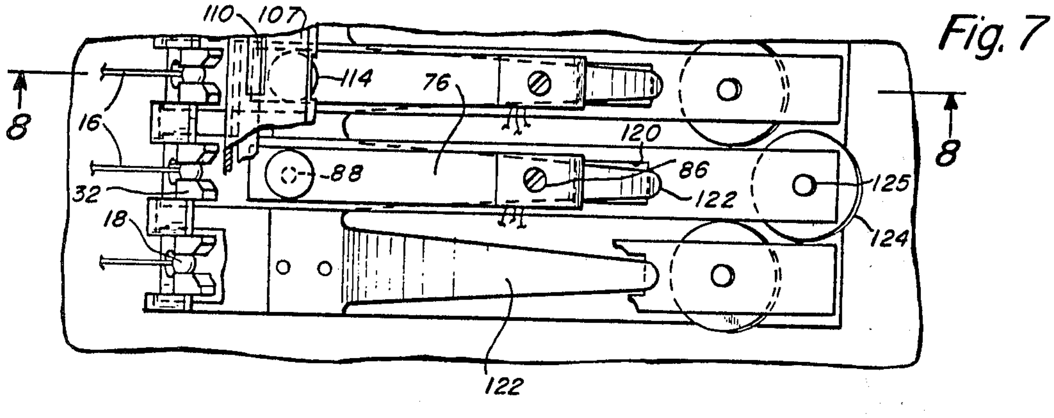
FIG. 7 is a fragmentary top view of still another version of the present invention.
Figure 8:
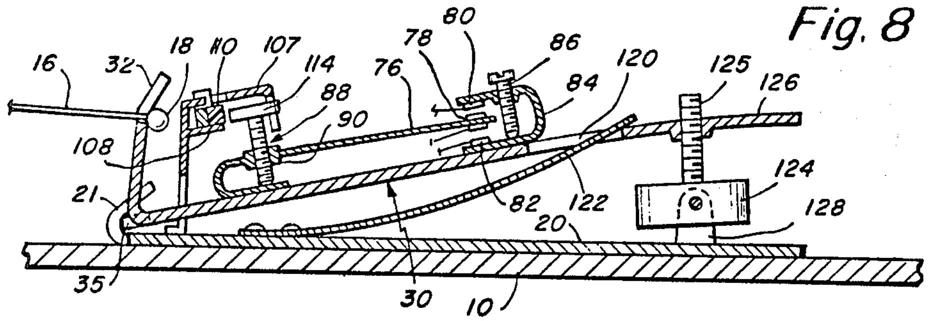
FIG. 8 is a cross-sectional view taken along line 8—8 of FIG. 7 showing further detail of this alternate version.

FIGS. 7 and 8 show another embodiment of the present invention using much of the identical structure shown in FIGS. 4 and 5. The device depicted in the embodiment of FIGS. 7 and 8 includes a base member 20 from which is supported the lever member 30. The string 16 is supported in the same way as previously indicated by means of the fingers 32. In the embodiment of FIGS. 7 and 8 the lever member 30 is somewhat longer being provided with an opening 120 for receiving one end of an auxilliary biasing spring 122. The other end of spring 122 is securely fixed to the member 20. The bi-directional sensing switch comprised of contacts 78, 80 and 82 may be of substantially the same construction as previously shown in FIG. 5. Also, the shroud and associated mechanism for operating the tuning screws 88 in unison may also be substantially the same as shown previously.

The construction shown in FIGS. 7 and 8 is somewhat simplified in comparison with the previous embodiments in that there is provided a direct connection from the drive motor 124 to the outer end 126 of the lever member 30. In this connection the end 126 has an aperture which is internally threaded for receiving a threaded shaft 125 from the motor 124. The motor 124 is suitably supported from a support member 128 which is affixed to the base member 20. The tensioning spring 122 passes through the opening 120 and contacts the outer end of the lever member to bias the lever member in a generally clockwise direction as viewed in the embodiment of FIG. 8. The motor 124, however, may be operated to move the lever member either upwardly or downwardly depending upon conditions sensed by the sensing switch arrangement. In this connection a schematic diagram such as the one shown in FIG. 6 may be associated with the embodiment of FIGS. 7 and 8 for providing control signals to the DC motor 124. As in the previous example of FIGS. 4–6, if an increase in tension is sensed by virtue of the contacts 78 and 80 closing, then the motor 124 is operated upon manual closing of the tune switch 140 to rotate the output shaft 125 in a direction which will decrease the tension in the associated string by rotating the lever member 30 an appropriate distance counterclockwise to thereby reduce the tension in the string. A similar operation occurs in the event of a sensing of a decreased string tension.

As clearly indicated in FIG. 7, one of the advantages for the use of the relatively small motor 124 is that these motors can be staggered as indicated in FIG. 7 to provide relatively close spacing which is advantageous in connection with applying the principles of the invention to a guitar. In the embodiment of FIGS. 7 and 8 the auxilliary spring is also another important feature in that this intends to counterbalance most of the tension imposed by the strings themselves. This thus allows for a less powerful drive means which will be a definite saving on any batteries that may be used in providing power to the circuitry such as the circuit of FIG. 6. The motor 124 depicted in FIGS. 7 and 8 may be of the well-known type such as those presently used in toys, cameras, and like devices.

In the embodiment disclosed herein, if a string breaks, the string can be returned quite easily. When a string breaks the tune button is pressed. This will cause the lever associated with the broken string to move to its fully extended or downward position. A new string is then installed and by using the regular tuning pegs on the guitar, the string is tuned two steps higher than normal. The tune button is then again pressed and the motor will operate to bring the string down in tension to the proper tension. This action will also cause the movable contact lead 76 to assume its centered position as shown in FIGS. 5 and 8.

Figure 9:
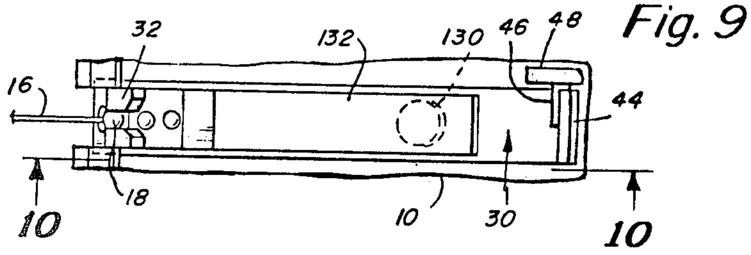
FIG. 9 is a fragmentary top view showing still another embodiment of the present invention.
Figure 10:
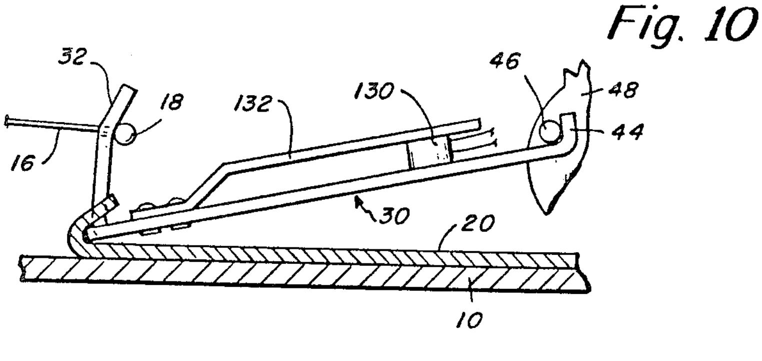
FIG. 10 is a fragmentary top view along line 10—10 of FIG. 9 showing further detail of this embodiment employing pizzoelectric sensing.

FIGS. 9 and 10 show a further version of the present invention wherein the sensing of a change in string tension is by means of a piezoelectric transducer 130. The piezoelectric transducer is preferably supported between the lever member 30 and support leaf 132. The piezoelectric transducer may be fixed to the support leaf 132. The other end of the support leaf 132 is fixedly secured to the lever member 30. The piezoelectric transducer 130 senses the pressure change and converts this pressure change to a representative electrical signal which may be sensed and the magnitude of which indicates the degree of tension in the lever member 30.

Figure 11:
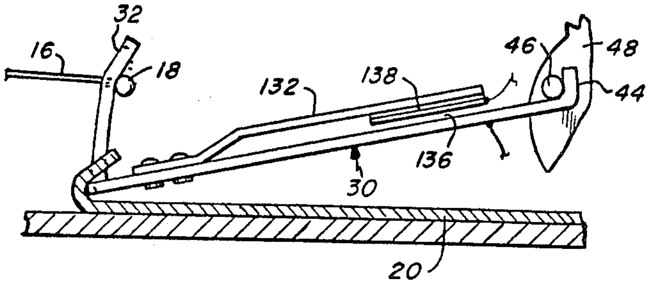
FIG. 11 is a cross-sectional view depicting still a further embodiment of the present invention employing capacitive sensing.

FIG. 11 shows still another version of the present invention employing substantially the same structure as depicted in FIGS. 9 and 10 including a lever member 30, a base member 20, and support leaf 132. In this embodiment, the sensing of the displacement of the lever member 30 by tension in the string is sensed capacitively. In this connection, the lever member 30 is conductive as is the support leaf 132. A capacitor is essentially formed between these metallic members by means of the air space 136, and one or more dielectric sheets 138. Also, an insulator is preferably provided between members 30 and 132 at their point of connection so that these two metallic members are not at the same reference level. This version operates on the basis of change in the spacing between the capacitor plates by virtue of a change in the tension on a string.

Figure 12:
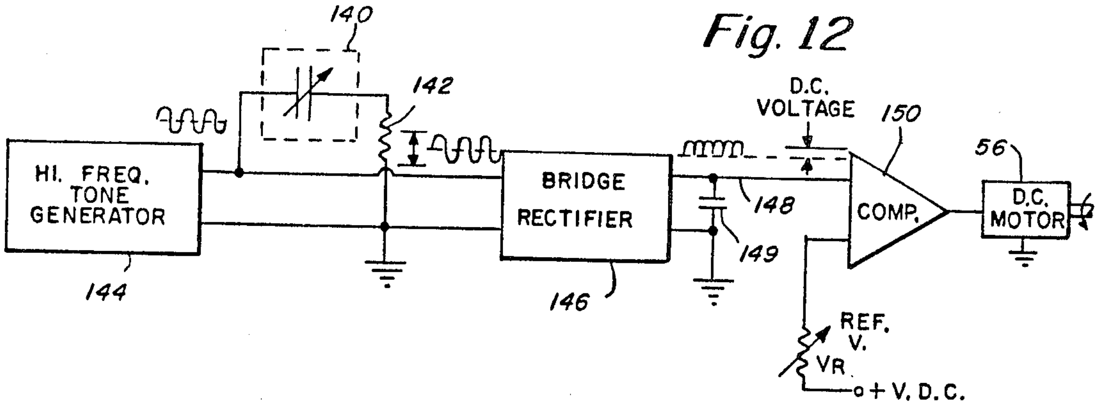
FIG. 12 is a circuit diagram associated with the embodiment of FIG. 11.

In FIG. 12 the capacitor formed and shown in FIG. 11 is represented by a variable capacitance 140. This capacitor is connected in series with resistor 142 across the output terminals from the high frequency tone generator 144. The amplitude of the output signal from the generator 144 is essentially modulated by the capacitor resistor series combination to provide a peak-to-peak signal into the bridge rectifier 146 with the magnitude of the peak-to-peak signal being a function of the value of the capacitor 140. The bridge rectifier 146 is a full wave rectifier providing the full wave signal shown in FIG. 12 on the output line 148. This signal is preferably filtered by capacitor 149 to provide a substantially level DC signal on one input to comparator 150. The other input to the comparator is set at a reference level by means of the reference circuit set by a variable potentiometer. When a sufficient level amplitude signal is delivered at the output line 148 to the comparator 150, when the output of the comparator will drive the DC motor 56. The output signal from the comparator 150 will be positive or negative depending upon when the signal on line 148 is greater or less than the reference level. When the tension is proper in the string, then the output from the bridge rectifier 146 should be at approximately the same level as the reference level. Under that condition, then there is essentially no output from the comparator 150 and thus the DC motor 156 is not operated in either direction. In the event that the tension changes so that there is either an increase or decrease in the distance and thus a change in the capacitance, then there will be a positive or negative change in the signal on line 148 which change will be coupled to the DC motor 56 to operate the motor in the appropriate direction to compensate for this change in capacitance. As the capacitor plates are separated, the voltage into the bridge rectifier increases, thus providing positive signal to the DC motor to cause the capacitor plates to decrease to their desired normal position corresponding to a normally tuned condition of the associated string.

Figure 13:
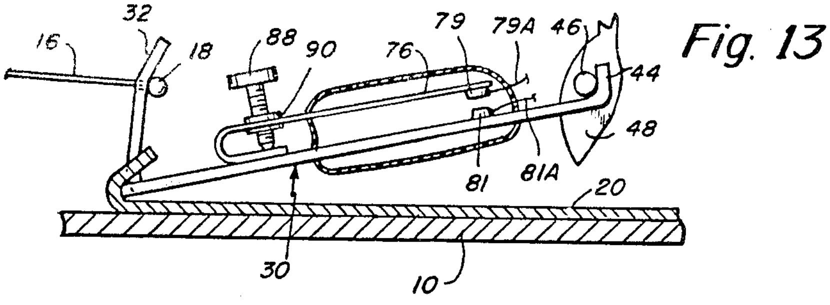
FIG. 13 shows still a further embodiment of the present invention in a cross-sectional view.

FIG. 13 depicts a further version of the present invention which is quite similar to the version shown in FIG. 5 as previously discussed. Thus, the embodiment of FIG. 13 includes a lever member 30 pivoted from the base member 20 for supporting one end of the string 16 at the fingers 32. The other end of the lever member 30 engages with the pin 46 on gear 48. This version also includes a tuning screw 88 received by insert 90 supported from the contact leaf 76. The free end of the contact leaf 76 supports single contact 79 while the opposite end of the contact leaf 76 is fixedly supported from the lever member 30. The switch arrangement in FIG. 13 differs from the one shown in FIG. 5 in that there are only two contacts 79 and 81. Thus, there are only two conditions of switch position in FIG. 13 in contrast with the three different positions of FIG. 5. In FIG. 13 the contacts are either opened, as shown in FIG. 13 or closed. The contacts are open and at decreased string tension the contacts close. FIG. 13 also shows the associated leaves 79A and 81A coupling from the contacts 79 and 81 respectively.

Figure 14:
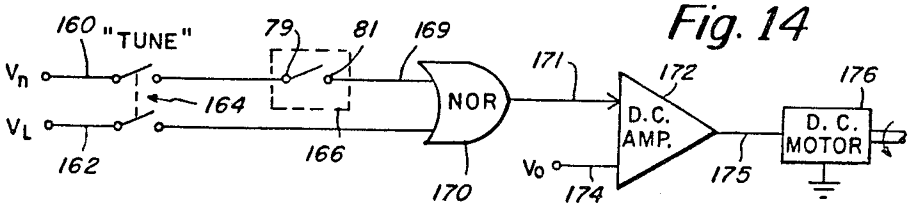
FIG. 14 is a logic diagram associated with the embodiment of FIG. 13.

The logic circuit diagram of FIG. 14 is associated with the embodiment of FIG. 13. In this circuit, voltage levels $V_h$ and $V_l$ are coupled respectively to lines 160 and 162. The $V_h$ voltage may be on the order of six volts while the $V_l$ may be zero volts. The voltage level on line 160 couples by way of a tune switch or button 164 to sensing switch 166 which comprises the contacts 79 and 81 also identified in FIG. 13. The output from switch 166 couples from one side of NOR gate 170. The signal on line 162 couples directly to the other input of the gate 170. The output of the gate 170 couples to one input of the DC amplifier 172. A reference voltage $V_0$ is applied to the other input 174 of the amplifier 172. The amplifier 172 couples to the DC motor 176 wich may be the same as motor 76 previously described. The voltage $V_0$ may be the average of voltages $V_h$ and $V_l$ or in the previously given example may be on the order of 3 volts.

The arrangement of FIGS. 13 and 14 operates as follows. The circuitry is meant to maintain the contacts 79 and 81 just at the brink of opening or closing; this position representing a tuned position of the string. When the tune button 164 is closed and assuming that the contacts 79 and 81 are substantially open, the zero voltage level on line 162 provides a high level output signal on line 171 coupled to the amplifier 172. The amplifier 172 functions much as a comparator comparing this high level 6 volt signal on line 171 with the lower three volt signal on line 174 to provide a positive voltage level on line 175 to the DC motor driving the DC motor 176 in a direction that will decrease the tension in string 16 moving the contacts 79 and 81 closer toward a closing position. When the contacts close during this tuning operation, or if the contacts are initially closed when tuning commences, there is then a high voltage level signal at input 169 to the gate 170 and a low voltage level signal on the other input to the gate 170. This causes the output level from gate 170 on line 171 to be at a low voltage level signal of, for example, zero volts. The amplifier 172 under this condition immediately provides an opposite polarity signal on line 175 to drive the motor 176 in the opposite direction tending then to open the contacts. This cycling may continue but as soon as the operator notes that the string is tuned, motor 176 ceases. The tune button 164 may also have other contacts associated therewith so that when this button is not pressed, all voltages to, for example, the amplifier 172 are interrupted. In this way it is assured that there can only be a control output from the amplifier 172 when the tune button is operated.

Figure 15:
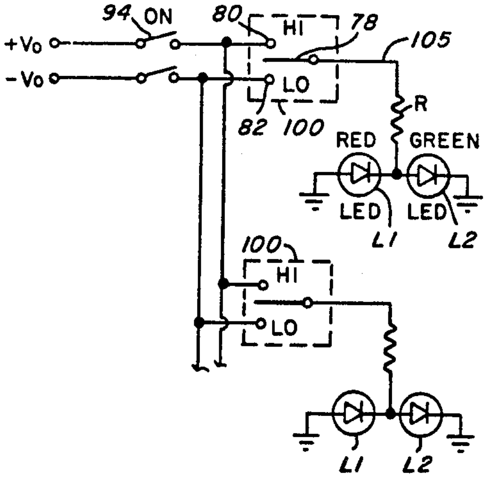
FIG. 15 is a circuit schematic diagram showing the control circuitry for a simplified version of the invention employing manual tuning with automatic sensing.
Figure 16:
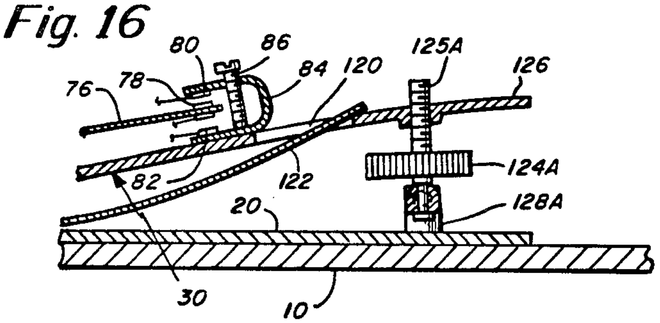
FIG. 16 is a fragmentary view showing the sensing switch and manual tuner.

FIGS. 15 and 16 illustrate another embodiment of the present invention that is used for tuning a musical instrument. In this embodiment the tuning of the string is sensed automatically by a switch arrangement such as shown in FIGS. 5 and 8. A fragment of this switch arrangement is shown in FIG. 16. However, in place of the automatic control to a motor or the like, the retuning of the string is occasioned manually. In FIGS. 15 and 16 like reference characters have been used as previously designated in FIGS. 6 and 8. With regard to FIG. 16, the sensing device is substantially identical to that shown in FIG. 8. The string is supported in the same manner as shown in FIG. 8. The lever member 30 is provided with an opening 120 for receiving one end of an auxillary biasing spring 122. The other end of the spring 122 is securely fixed to the base member 20. The bi-directional sensing switch comprised of contacts 78, 80 and 82 may be of substantially the same construction as shown in FIGS. 5 and 8. Also, the shroud and associated mechanism for operating the tuning screws in unison may be substantially the same as shown previously. A manual adjusting knob 124A is supported between member 128A and the threaded shaft 125A. The end 126 of the lever has an aperture which is internally threaded for receiving the shaft 125 which is in turn operated from the thumbwheel adjustment 124A. This arrangement is simply used for moving the lever 30 to provide fine tuning of the string in accordance with an out-of-tuning signal which is a visual signal from the indicators of FIG. 15.

FIG. 15 shows a schematic diagram of the circuitry used to visually indicate to the player that the string or strings are out of tune. In FIG. 6 only two stages are shown including two bi-directional switches 100. Each of these bi-directional switches is shown schematically as including the contacts 78, 80 and 82 previously discussed with regard to FIG. 16. The contacts 80 and 82 receive respectively positive and negative voltage levels by way of the on-off switch 94. The movable contact 78 may be in an intermediate position between the contacts 80 and 82 or may couple signals from either one of these contacts but of course not from both contacts at the same time. The movable contact 78 fixed to the contact lead 76 couples to signal line 105 which in turn couples by way of resistor R to the pair of light emitting diodes L1 and L2. The diode L1 may illuminate a "red" condition, while the diode L2 illuminates a "green" condition. The red or green indication at the light emitting diodes indicates that the string is sharp or flat, respectively. When either of these conditions is indicated, then the thumbwheel 124A may be rotated in the proper direction to retune the string. For example, if the contacts 78 and 80 are closed, then the lead L2 is illuminated which is an indication that the string should be loosened. In the alternative, when the contacts 78 and 82 are closed, this is an indication that the string should be manually tightened. This arrangement is particularly advantageous in that even if the thumbwheel is rotated in the wrong direction, one can see that the light does not extinguish and thus will naturally rotate in the opposite direction to cause an extinguishing of the illuminated indicator.

Having described a limited number of embodiments of the invention, it should now be understood that the description is intended merely to be illustrative thereof and that other embodiments and modifications may be apparent to those skilled in the art without departing from the spirit and scope of this invention.

Having thus described the invention, what I desire to claim and secure by Letters Patent is:

1. A method of adjusting the tuning of at least one string of a stringed musical instrument, comprising the steps of;

sensing a tension associated with the string, determining when the sensed tension deviates from a preselected tension and providing a visual indication corresponding to two different tension levels corresponding to sharpness and flatness of the associated string, and manually adjusting the string tension in a direction to increase or decrease the tension and in accordance with the visually distinguishable tension levels for retuning the string.

2. A method as set forth in claim 1 wherein a mechanical switching action is provided in response to the sensed tension.

* * * * *